United States Patent [19]

Staats

[11] 4,102,730

[45] Jul. 25, 1978

[54] TWO STAGE OVEN LAMINATOR

[75] Inventor: Henry N. Staats, Deerfield, Ill.

[73] Assignee: General Binding Corporation, Northbrook, Ill.

[21] Appl. No.: 837,295

[22] Filed: Sep. 27, 1977

Related U.S. Application Data

[62] Division of Ser. No. 584,374, Jun. 6, 1975, Pat. No. 4,056,422.

[51] Int. Cl.² .................. B37B 31/00; B31F 5/00; B02C 11/08
[52] U.S. Cl. .................. 156/499; 100/93 RP; 156/555; 156/583
[58] Field of Search .............. 156/499, 555, 583; 100/93 RP, 176

[56] References Cited

U.S. PATENT DOCUMENTS

| 2,235,682 | 3/1941 | Hawley, Jr. | 156/323 |
| 3,616,004 | 10/1971 | Samson | 156/306 |
| 3,801,250 | 4/1974 | Kaiser et al. | 100/93 RP |
| 3,994,769 | 11/1976 | Gersbeck | 100/93 RP |

Primary Examiner—Douglas J. Drummond
Attorney, Agent, or Firm—Hill, Gross, Simpson, Van Santen, Steadman, Chiara & Simpson

[57] ABSTRACT

A two-state oven type laminating apparatus including two heater systems operating at different temperatures whereby conventional polyester-polyethylene combinations may be laminated relatively bubble-free and without distortion of the polyester.

5 Claims, 6 Drawing Figures

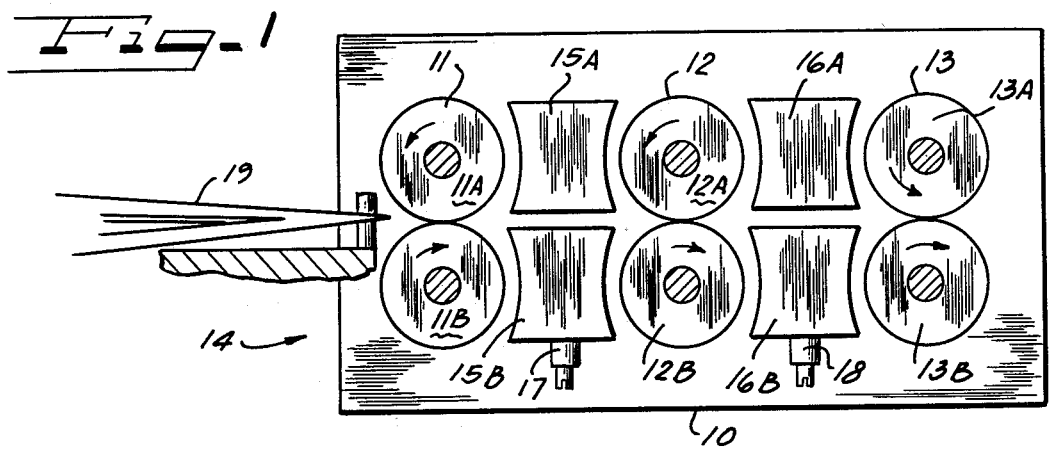
Fig-1
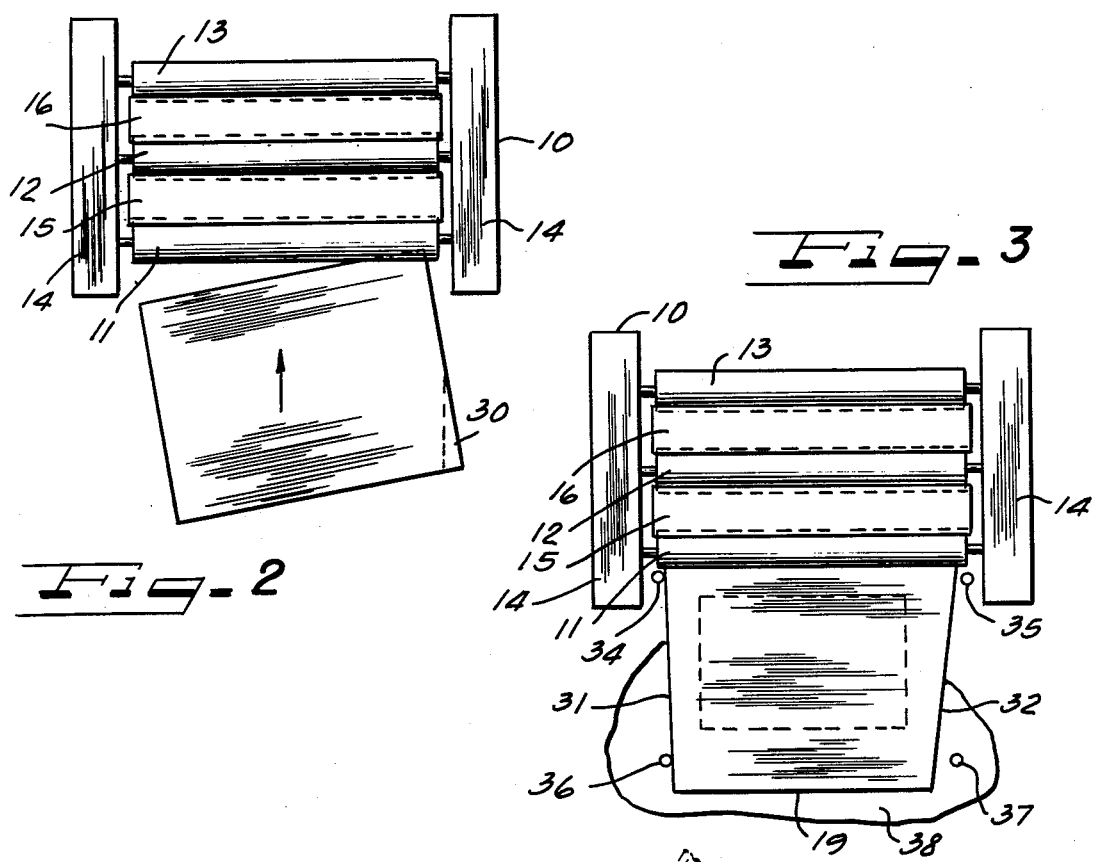
Fig-2
Fig-3
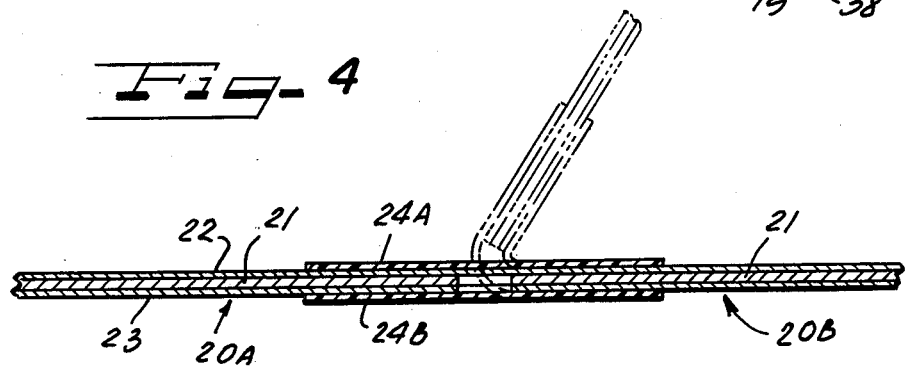
Fig-4

TWO STAGE OVEN LAMINATOR

This is a division of application Ser. No. 584,374, filed June 6, 1975 now U.S. Pat. No. 4,056,422.

This invention relates to apparatus for laminating polyester-polyethylene film combinations.

An oven type laminator of the type described in U.S. Pat. No. 3,711,355 assigned to the same assignee as this application is capable of laminating a variety of films. The preferred film configuration used therein employs an adhesive acting at a temperature approximately 15° lower than conventional polyester-polyethylene combinations. This lower melt adhesive combination when processed in a machine with optimum temperature and speed produces a successful product and has widespread commercial use. Other machines employ other types of low temperature co-polymer adhesives. Generally speaking, however, low temperature film adhesive combinations cost more than conventional polyester-polyethylene combinations. Therefore, it would be desirable to use conventional polyester-polyethylene combinations. However, the latter does not process well in known oven type laminators. It appears that the higher temperature which is required to activate polyethylene causes a distortion of the polyester. This is especially so in thin gauges, that is in the thickness range of 0.0015 inches to 0.003 inches. In view of this, it becomes impractical to laminate ordinary office paper, for example, which would find many uses. Despite the higher temperature requirement of polyesterpolyethylene film combinations, it is technically possible to lower machine temperatures for processing but this can be done only when accompanied by a corresponding reduction in machine speed. If the machine speed is reduced, however, the process then becomes commercially unacceptable since present oven type laminators operate at approximately 1.5 lineal feet per minute. While this is an adequate speed for processing small I.D. cards, it is too slow for larger sheets, such as, for example, 8½ inches × 11 inches paper sheets and would be still less so if the machine were slowed down to run at a lower temperature.

One solution to this problem would be to widen the heater so that the film is exposed longer. However, wider heaters are more expensive to construct and they have frequently been found to distort in use. It has also been found in practice that doubling the heater widths, for example, does not permit significantly increased machine speed.

In addition, when laminating photographs, for example, with heavy gauge film ranging in the thickness of 0.005 inches to 0.010 inches, bubbles occur on the photographs. The occurrence of bubbles in laminated photographs, especially in heavy gauges, is common and has been the subject of considerable research over the years. One approach to the bubble problem is the subject of U.S. Pat. No. 3,836,414 issued Sept. 17, 1974 and assigned to the same assignee as the invention herein. In one research project, it was revealed that when a photograph is laminated with the heavy gauge film, and especially with low temperature adhesive, and the heat-speed regime is adjusted to obtain an interface temperature between adhesive and photograph slightly less than that required to obtain the ultimate in bond, no bubbles occur. Evidence of bubbles is exhibited by a "blush" or matte appearance. This suggests that the adhesive attaches itself to the photograph to some extent so that one could say technically that lamination has been achieved but such a result is not commercial since the "blush" interferes with the esthetics of the photograph and bond integrity. This, of course, jeopardizes the security aspect of the finished laminate. Nevertheless, when the blush condition prevails, no bubbles occur. It has been found that if a bubble-free but blushed laminated photograph is processed a second time in a machine which is calibrated to produce higher interface temperatures, then no bubbles occur as a consequence of the second process since the higher temperatures remove the "blush" and improves the bond integrity.

It is, however, commercially uneconomical to have two machines, one calibrated at a low temperature and one at a higher temperature, to achieve bubble-free laminates. In addition, the possibility of processing in the wrong sequence exists. Accordingly, it becomes desirable to develop an apparatus in the form of a single unit which is able to overcome the deficiencies described above.

SUMMARY OF THE INVENTION

It is a principal object of the invention to provide laminating apparatus which will successfully laminate polyester - polyethylene film combinations at low cost.

It is another object of the invention to provide an oven type laminator which will be effective to eliminate bubbles on photographs when the latter are laminated with a heavy gauge film.

Another object of the invention is to provide a two-stage oven type laminator wherein sequential heaters operating at different temperatures will produce an acceptable laminated product using thin gauge film.

Another object of the invention is to provide a separately controlled two-heater oven laminator with lower temperature on the first heater than on the second to inhibit or prevent formation of bubbles on glossy or smooth objects such as photographs, metal, etc., with low temperature adhesives and conventional polyester.

It is another object of the invention to provide a two-stage heater oven laminator which will operate to cause preliminary lamination of polyethylene adhesives in the first heater stage (which is at a lower temperature) without distorting the polyester and finish laminating in the second stage (where the heater is operating at a higher temperature) without polyester distortion.

Another object of the invention is to provide means whereby thin gauge polyester-polyethylene combinations can be laminated to ordinary office paper or card stock.

It is another object of the invention to provide for use in conjunction with a two-stage oven laminator a pouch-type aluminum carrier for carrying the material to be laminated.

Still another object of the invention is to provide an oven type laminator into which a large carrier can be introduced.

Another object of the invention is to provide means associated with the two-stage oven laminator whereby carriers for the product to be laminated can be substantially large and which will assist in properly inserting the carrier into the laminating apparatus in such a manner so that it will not self-destruct.

By way of summary, it can be stated that the invention herein provides means in the form of a two-stage oven type laminator but containing heaters operating at different temperatures so that the conventional polyester-polyethylene combinations may be laminated without distortion of the polyester. In addition, a new carrier for the object to be laminated has been developed which is tough and resistant to substantial handling.

Other objects and advantages of the invention will become more readily apparent when considering the following description and the accompanying drawings.

BRIEF DESCRIPTION OF THE DRAWINGS

FIG. 1 is a schematic diagram in elevation showing the general arrangement of rolls and intermittently positioned heaters in a two-stage oven type laminator embodying the invention herein;

FIG. 2 is a schematic diagram of a plan view of a two-stage oven laminator showing the carrier for a product to be laminated about to enter the laminator in a position so that it will actually self-destruct.

FIG. 3 is a plan view of a two-stage oven type laminator illustrating guide means at the entrance to the laminator for positioning the carrier of a product to be laminated in a manner that it will not self-destruct when entering the laminating apparatus.

FIG. 4 is an end edge view of a carrier assembly in its flattened out position.

DESCRIPTION OF A PREFERRED EMBODIMENT

Figure 5:
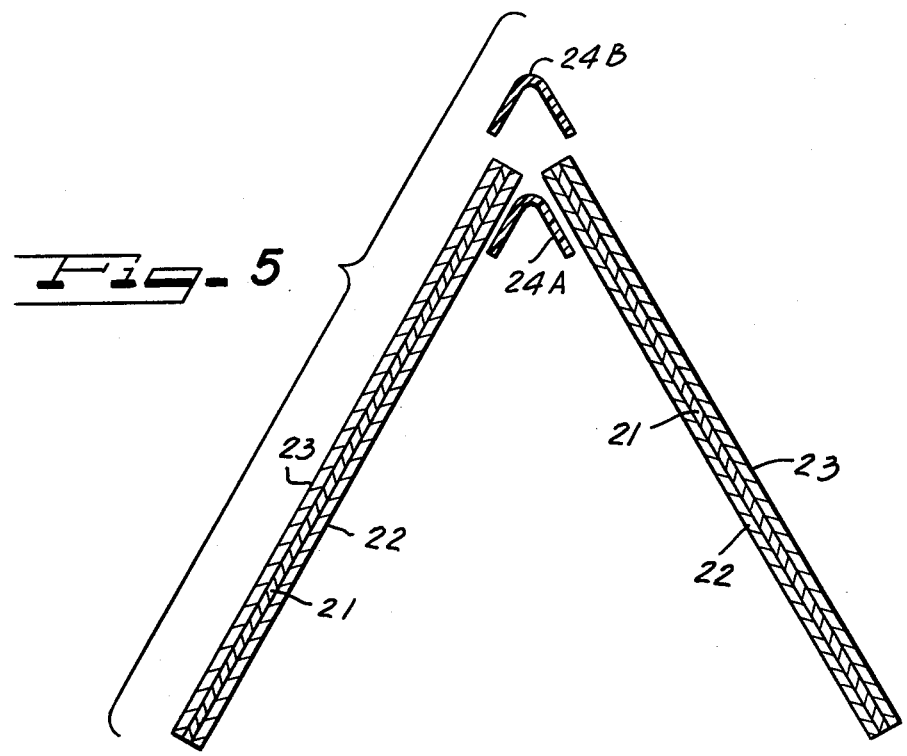
FIG. 5 is an end view of a carrier assembly in a partially folded condition showing the hinge element.

Turning now to the drawings wherein like reference characters designate similar parts in the different views, FIGS. 1, 2 and 3 illustrate generally a two-heater stage oven type laminator embodying the invention herein and is designated generally by the numeral 10. The laminator 10 comprises three sets of resilient rolls 11, 12 and 13, comprising, respectively, rolls 11A, 11B, 12A, 12B and 13A, 13B. Each of the rolls is rotatably mounted within a housing having a pair of support frame members which may be designated generally as 14 for counterrotation in the direction of the arrows as indicated, respectively, on each of the rolls by the arrows thereon. The second and third sets of rolls, namely 12A, 12B, and 13A, 13B are laminating rolls which are driven in synchronism with rolls 11A, 11B and preferably are drivingly interconnected with rolls 11A, 11B. The first set of rolls 11A and 11B are feed rolls and at least one of said rolls is driven from an appropriate power source. Means (not shown) are provided for driving at least one of the rolls of the set of feed rolls 11A, 11B. In each set of the rolls, the A and B rolls are yieldably and resiliently biased together. They yield and separate as required to permit a carrier bearing a product to be laminated to be inserted therebetween and moved forward through the laminator by counterrotation of the rolls. Heater units 15A and 15B are interposed between the sets of rolls 12 and 13. Preferably the heaters substantially fill the horizontal space between roll sets and the upper and lower heater units are vertically slightly spaced to permit a pouch carrying product to be laminated to pass therebetween without touching, or with touching at only slight pressure. A thermostat 17 controls the temperature of the heater 15 and a thermostat 18 separately controls the temperature of heater 16.

Figure 6:
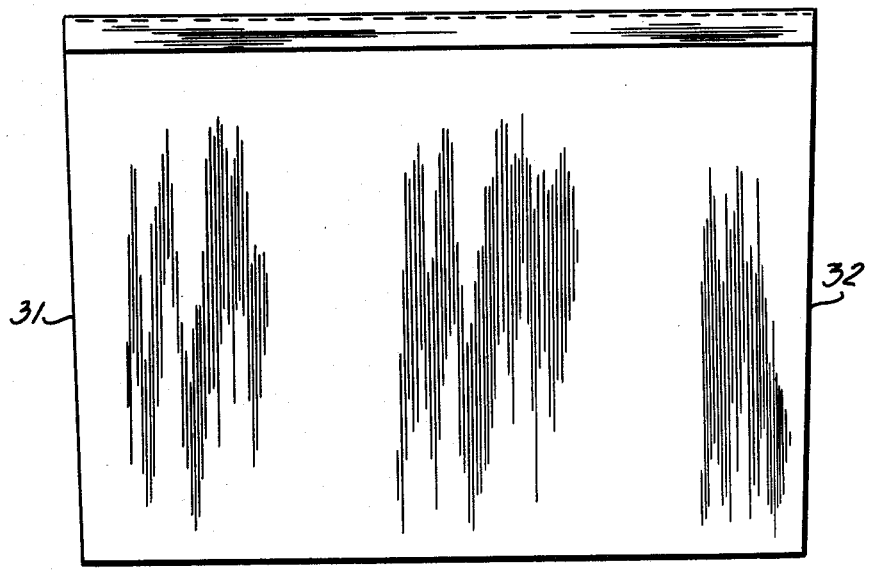
FIG. 6 is a plan view of a carrier assembly having tapered edges.

In the utilization of this two-stage oven type laminator unit, it is appropriate to use a pouch carrier assembly of the type generally illustrated in FIGS. 4, 5 and 6. The heater unit utilized herein is particularly adaptable to process products to be laminated carried in a pouch carrier assembly which may be on the order of 12 inches by 16 inches. The pouch carrier assembly 19 as shown in FIGS. 4 and 5 consists of a pair of assemblies 20A and 20B each comprising a pair of thermally conductive sheets of material 21, preferably sheets of aluminum, of about .003 inches in thickness and freezer wrap paper sheets 22 and 23 laminated to each side of the aluminum sheets 21. The freezer wrap paper preferably comprises a one-sided polyethylene coated paper. In the assembly the inner sheets 22 (when the carrier assembly is folded) preferably are sprayed with Teflon.

A pair of hinge members 24A and 24B each approximately 1 inches in width interconnect the assemblies 20A and 20B, the folding of the pouch occurring at these hinges. The portions 20A and 20B require that a fairly stiff but thin aluminum sheeting be used as a central core portion if the carrier assembly is to be of a size on the order of 12 inches by 16 inches. Aluminum sheeting if used by itself is tough enough to withstand a multiplicity of trips, for example 75 to 100 trips, through a machine at the desired speed temperature combination. However, such an aluminum sheet by itself would be too hot to handle upon emerging from the machine. Furthermore, small dents and marks accumulated from usage would undesirably imprint into the finished laminate. It was discovered that if each of the two central core sheets of aluminum 21 were laminated with one-sided polyethylene coated freezer wrap paper 22 and 23, the outside of the carrier assembly became easier to handle and the surface of the paper imprinted a slight but desirably regular pattern to the laminate. The paper also made the aluminum sheeting dent resistant to the point where carrier assemblies lasted 200 to 300 times before discarding became necessary. The Teflon coating on the inside sheets is transparent and due to its non-sticky character is effective to solve the squeeze-out problem resulting from the transfer of adhesive to the inside paper.

When a carrier assembly of the type shown in FIGS. 4, 5 and 6 is introduced into the nip of the first set of rolls 11A and 11B, it is committed to proceeding through the entire laminator apparatus in the same position in which it was inserted. In other words, if the carrier assembly 19 is inserted into the laminator in a cocked position as shown in FIG. 2, a corner 30 of the carrier assembly would be destroyed in proceeding through the laminating apparatus. Obviously, such a possibility permaturely shortens the life of a carrier assembly and in addition may create a time-consuming jam within the laminator machine itself. This problem was resolved by tapering the carrier assembly to provide tapered edges 31 and 32 on the carrier assembly itself. In addition, guide pins 34, 35, 36 and 37 as shown in FIG. 3 were positioned on the entrance table 38 to the laminator to serve as a guide means for the carrier assembly 19 as it was inserted into and entered the laminating machine. Obviously, other means besides the pin members could be used as a guide for the carrier assembly 19. Such means might include, for example, elongated members which are positioned in a position extending between points 34, 35, 35, 37.

We have examined the processing of thin gauge film, for example, 0.0015 inches and 0.003 inches of conventional construction, that is, polyester-polyethylene film, onto typical office paper and card stock with the thought that more heat could be introduced into the product to be laminated without distortion of the polyester as previously noted. This work indicated that too much heat had been introduced into the system within a particular time period to melt the polyethylene and thus causing the polyester to shrink prematurely. If, however, the temperature and speed regime were sufficiently changed to prevent polyester problems, then there was not enough heat to laminate. This was the cause, for example, with polyester-polyethylene combinations where stick-seal temperatures are on the order of 210°–220° F, whereas stick-seal requirements with polyester low temperature adhesive are about 190° F – 200° F and no polyester distortion occurred with the latter combination.

It has been determined that, with conventional polyester-polyethylene combinations, if we can obtain a preliminary superficial tack at lower temperature in a first heater this superficial lamination can be accomplished without distortion of the polyester despite the fact that the lamination would not, at least at that point, be commercially successful. When this superficial laminate is subsequently processed through pressure rolls at a higher temperature, the laminate reaches its ultimate integrity and appearance. Thus, by properly applying a sequence of different increasingly elevated temperatures at a given speed, it was possible to successfully secure the polyethylene to the object to be laminated without polyester distortion.

A series of tests were run to confirm the above results. Tests were run beginning at speeds in the 1 to 1.5 feet per minute range with a heater No. 1 at approximately 220° F. ± 10° and heater No. 2 at 240° F ± 10°. At the time this output speed was considered undesirably slow for commercial use with 8½ inches × 11 inches or larger paper. Subsequent work led to a regime wherein the speed ranged from 5 to 5.5 feet per minute with the first heater temperature being at 250° F ± 20° F and the second heater temperature being at 275° ± 20° F.

The apparatus herein described is particularly useful for laminating polyester-polyethylene film to paper and card stock. Research has revealed that when using a carrier assembly of the type described and a two-stage heating laminator, any combination of polyester-polyethylene film with paper and card stock up to a total thickness of 0.022 inches could be laminated. For example, 0.004 inch paper, which is a typical thickness, could be laminated on both sides with 0.0015 inch film. In addition, 0.012 inch card stock could be laminated on both sides with 0.005 inch film. The capability ranged from a minimum of 0.007 inches to 0.022 inches, and combinations such as three sets of 0.004 inch paper and 0.0015 inch were tried with successful lamination. A two-stage oven laminator of the type described herein will thus produce multiple - up laminates, making it possible for oven type laminators to compete with roll type laminators although being of considerably lower cost. In addition, an oven type laminator employing pouches is easier and more convenient to use.

It will be apparent that I have advantageously provided a unique laminator which is a two-stage heater oven laminator utilizing a lower temperature on one heater than on the other. This is effective to inhibit or prevent the formation of bubbles on glossy or smooth objects such as photographs, metal, etc., using low temperature adhesives and conventional polyester. Such a unit is also effective to cause preliminary lamination of polyethylene adhesives in the first heater stage (when the temperature on the first heater is lower) without distorting the polyester and then finish laminating in the second stage without polyester distortion (when the higher temperature is on the second heater).

In addition, I have developed a unique carrier having a central core of aluminum and coated with a polyethylene freezer wrap paper which carrier has long life, has the capability of conducting heat well to the product, is easy to handle upon exiting from the laminator, and rejects adhesive squeeze-out. In addition, this carrier resists denting and marking and adds a slight texturizing to mask or minimize inevitable marking which occurs from repeated usage. Furthermore, the shape of the carrier is made so that it will avoid self-destruction and machine jamming.

While a preferred embodiment of the invention has been disclosed, it will be appreciated that it has been shown by way of example only and the invention is not to be limited thereto as other variations probably will be apparent to those skilled in the art and the invention is to be given its fullest possible interpretation within the terms of the following claims.

What is claimed is:

1. An oven type plastic laminating apparatus for laminating heat sensitive plastic material and discrete sheet of material comprising:
    a housing;
    a first pair of feed rollers rotatably mounted in said housing;
    a second pair of laminating rollers rotatably mounted in said housing and spaced from said first pair;
    a third pair of laminating rollers rotatably mounted in said housing and spaced from said second pair of rollers;
    first heater means disposed between said first and second pair of rollers;
    second heater means disposed between said second and third pair of rollers;
    said first heater means operating at a temperature providing only partial lamination between said materials and said second heater means operating at a higher temperature than said first heating means.

2. The apparatus of claim 1 wherein
    said first heater means operates at a lower temperature than required to successfully laminate polyethylene.

3. The apparatus of claim 1 including
    guiding means at the entrance to said first pair of feed rolls for requiring a carrier carrying material to be laminated to be introduced into the feed rolls so that the trailing edge of the carrier will not be cocked when moving through the apparatus, thereby avoiding damage to the carrier and its contents.

4. The apparatus of claim 3 wherein
    said guiding means comprises guide pins disposed on the feed table positioned ahead of said first set of feed rolls.

5. The apparatus of claim 1 wherein
    said first heater is operated in a temperature range of 230° F – 270° F and said second heater is operated in a temperature range of 255° F – 295° F and the movement of product to be laminated through the laminating apparatus is at a speed of approximately 5 – 5.5 ft/min.

* * * * *